United States Patent Office

3,562,203
Patented Feb. 9, 1971

3,562,203
STYRENE RESINS OF CONTROLLED PROPERTIES
Louis Grunin, Spring Valley, and George B. Duhnkrack and William P. Kinneman, Jr., Suffern, N.Y., and Phillip Gilbert, Fairfield, N.J., assignors to Koppers Company, Inc., a corporation of Delaware
No Drawing. Original application Oct. 5, 1966, Ser. No. 584,382, now Patent No. 3,493,636, dated Feb. 3, 1970. Divided and this application Sept. 10, 1969, Ser. No. 856,812
Int. Cl. C08f 45/04
U.S. Cl. 260—41
2 Claims

ABSTRACT OF THE DISCLOSURE

Lustrous pearlized sheets for use in button blank manufacture are made from a styrene-divinylbenzene copolymer formed by a prepolymer syrup having a latent gel structure. Pearlized pigment particles are added to the pre-polymer syrup and subjected to movement in order to effect systematic orientation of the particles.

CROSS-REFERENCE TO RELATED APPLICATIONS

This application is a division of our copending application Ser. No. 584,382, filed Oct. 5, 1966, now U.S. Pat. No. 3,493,636.

This invention relates to a new method of making styrene-divinylbenzene copolymers. In one specific aspect, it relates to styrene-divinylbenzene copolymers of improved properties made by the controlled introduction of divinylbenzene during the polymerization of the resinous mass.

It is well known that the heat resistance, solvent resistance, and impact strength of styrene polymers can be modified by the incorporation of a minor amount of divinylbenzene, which serves to cross-link the long polystyrene chains, thereby forming a three-dimensional polymeric network. Conventionally, such polymers are made by mixing the two monomers and polymerizing at an elevated temperature in the presence of a suitable amount of a free radical initiator. Special polymers of styrene and divinylbenzene have been reported by G. F. D'Alelio in U.S. Pat. 2,405,817. According to D'Alelio, a soluble, fusible polymer of divinyl benzene is first isolated from its solution in diethylbenzene and thereafter mixed with styrene and copolymerized.

The physical properties of the known styrene-divinylbenzene copolymers vary considerably, but, in general, these copolymers are characterized by improved resistance to solvents, heat, and impact. The degree of improvement in properties is known to be measurably influenced by the amount of divinylbenzene present in the copolymer. The influence of divinylbenzene content in typical styrene-divinylbenzene copolymers is reported in Boundy and Boyer, "Styrene, Its Polymers, Copolymers and Derivatives," Reinhold Publishing Corporation (1952), on page 725. According to Boundy and Boyer, the impact strength of styrene-divinylbenzene copolymers increases with the first small amount (about five percent) of divinylbenzene and then falls off rapidly because of the embrittling effect of divinylbenzene in the copolymer.

We have discovered a novel method of making styrene-divinylbenzene copolymers involving the controlled distribution of divinylbenzene within the polymer network. The controlled distribution of divinylbenzene permits variation in polymer properties as desired for particular end use applications. It also makes it possible to introduce more divinylbenzene into the copolymer without causing embrittlement and, with the selection of special conditions, provides products of greater impact strength than those reported by Boundy and Boyer.

It is known that, during the polymerization of conventional styrene-divinylbenzene copolymers, an abrupt structural transition occurs and the viscosity of the liquid monomer-polymer mixture increases suddenly until is no longer flows. At this point (at about five to ten percent polymerization), a gel has formed as a result of the linking together of polymer molecules in a three-dimensional lattice work of indefinitely large size. As the polymerization continues, the complexity of the lattice structure increases and the gel becomes mechanically stronger, thus resulting in a rigid polymer. Because of the tendency of the gel to form at very early stages of the polymerization, it has been difficult to use styrene-divinylbenzene copolymers effectively in reinforced plastics and in other applications involving impregnation or the introduction of special filler materials prior to complete polymerization. The mixed monomer system has insufficient viscosity for these applications and a partial polymerization results in too drastic an increase in viscosity because of gel formation. D'Alelio sought to overcome these problems by dissolving a fusible polymer of divinylbenzene in styrene, but the D'Alelio product is largely a polymerized mixture of divinylbenzene and styrene polymers, rather than an integrated copolymer.

The manufacture of sheeting for button blanks requires a polymeric product having good hot abrasion resistance, good solvent resistance, and good impact strength. Ordinarily, button blanks are made from polyesters or polymethacrylates. Modified styrene resins, such as the styrene-divinylbenzene copolymers, have not been heretofore useful in button blank manufacture, because the conventional styrene-divinylbenzene polymers were found to be substandard in their properties or unsuitable from the standpoint of required processing steps.

The manufacture of button blanks involves the incorporation and controlled orientation within the polymeric mass of a pearlescent pigment, commonly flat platelets or crystals of basic lead carbonate, in the millimicron size range. The luster or sheen of button blanks is provided by the introduction of the pearl pigment in an ordered and systematic orientation. Pearl pigment cannot be oriented in a mixture of styrene-divinylbenzene monomers. If the mixed monomers are partially polymerized, it is possible to orient the pigment, but because of the abrupt gelation of a copolymer having the required divinylbenzene content, the system is impractical and cannot be safely handled in commercial equipment. Moreover, the internal strain present within the copolymer is sufficient to cause cracking of the cast sheet during molding. If the amount of divinylbenzene used is reduced to decrease the rate of gel formation, the physical properties required for the final product are no longer achieved.

We have discovered that a styrene-divinylbenzene copolymer of controlled properties can be made by first preparing a pre-polymer syrup, characterized by a latent gel structure and containing a critical amount of divinylbenzene. The novel syrup is stable and is characterized by a solution viscosity in a range useful for the impregnation of paper, textile fibers, and glass roving or mats. The intrinsic viscosity of the novel syrup is sufficiently high to orient pearl pigment, and polymers of unexpectedly high impact strength are obtained by introducing additional divinylbenzene during subsequent polymerization. The subsequent introduction of divinylbenzene provides a controlled distribution of divinylbenzene throughout the polymeric network.

It is therefore an object of the invention to provide a novel method of making styrene-divinylbenzene copolymers of controlled properties which can be effectively used in applications for which conventional styrene-divinylbenzene resins have been considered unsuitable.

In accordance with the invention, a styrene-divinylbenzene copolymer containing up to 12 percent by weight divinylbenzene is made by first forming a pre-polymer syrup having a latent gel structure. The syrup is obtained by polymerizing styrene and from 1–3.5 percent by weight, based on the total weight of monomer charge, of divinylbenzene by heating a stirred mixture of styrene and divinylbenzene to an elevated temperature in the presence of sufficient free radical initiator to provide a polymerization rate of 5 to 80 percent per hour. The polymerization is continued under agitation for a period of time until the intrinsic viscosity of the mixture is at least 0.65 dl./g. in toluene at 30° C. and is terminated before gelation occurs by cooling the reaction mixture. The resulting polymer syrup can be stabilized if desired by the addition of a small amount of polymerization inhibitor.

The syrup contains generally between ten and forty percent by weight styrene-divinylbenzene copolymer in admixture with unreacted monomers. The stable syrup can be used as an impregnant and polymerized in situ to form first a rubbery B-stage copolymer which is then cured to a cross-linked infusible mass. The impact strength and other properties of the copolymer are materially improved by adding to the syrup additional divinylbenzene to bring the total divinylbenzene content of the final copolymer to 4–12 percent by weight. The additional divinylbenzene can be added before, during, or after the cooling step.

In a special embodiment of the invention, pearl pigment, additional free radical initiator, and additional divinylbenzene to bring the total content of divinylbenzene to 4–12 percent by weight are added to the syrup. The pearl pigment is subjected to movement within the syrup, conveniently by placing the syrup in a moveable or vibrating mold, which causes ordered orientation of the pigment. Polymerization is continued by heat curing at a temperature of 60–90° C. until reaction is complete. The resulting product is a tough, solvent-resistant, heat-resistant, lustrous sheet of good impact strength. Button blanks are made from the sheet by reheating the sheet in an oven at approximately 150° C. for a short period of time and cutting the hot sheet into blanks of the desired size.

Divinylbenzene can be used in the invention either as substantially pure monomer or as the usual commercial mixture of divinylbenzene isomers, ethylvinylbenzene, and minor amounts of other impurities. It is less expensive and, therefore, advantageous to use the commercially available mixtures, which range in divinylbenzene content from 50–60 percent by weight. Commercial mixtures generally contain divinylbenzene in a 2:1 ratio of meta:para isomers. Such mixtures also ordinarily contain a polymerization inhibitor which should be removed before use.

In the preparation of the novel pre-polymer syrup, the amount of divinylbenzene present is critical. If less than about one percent by weight divinylbenzene is used, the final product is not resistant to solvent attack. If greater than about 3.5 percent by weight is present, the pre-polymerization is extremely difficult to control because of rapid gel formation. Furthermore, the rapid formation of the gel sets up great internal strains within the polymeric network and the resulting material tends to crack during casting.

To make the syrup, styrene monomer and, if desired, the required amount of divinylbenzene are charged to a suitable reactor, which is conveniently equipped with a heating unit and cooling facilities, such as a water jacket or internal cooling coils. Alternatively, the styrene only is charged to the reactor and the divinylbenzene is added to the polymerization mixture as the reaction progresses. A suitable agitator is provided for continuous stirring of the reaction mass.

Polymerization is accomplished at an average rate of five to eighty percent per hour, preferably twenty to sixty percent per hour, by an appropriate selection of temperature conditions and amount and type of free radical initiator. The rate of polymerization also varies with the amount of divinylbenzene present in the system. Polymerization of systems containing the maximum divinylbenzene content (about 3.5 percent by weight) can be controlled within the desired rate range by using less catalyst and lower polymerization temperatures.

The rate of the pre-polymerization has an important bearing on the properties of the final product. If polymerization is too rapid, the reaction is difficult to control and the latent gel structure within the pre-polymer will contain a large amount of internal strain, which tends to cause cracking in the finished casting. Very slow polymerization rates are not commercially practical.

Convenient operating temperatures for producing the desired polymerization rate range between 50 and 100° C. It is possible to use temperatures higher than 100° C., although this requires the use of pressurized equipment. At temperatures below 50° C., the reaction proceeds at a rate which is not generally commercially useful.

Suitable free radical initiators include those capable of releasing free radicals at the pre-selected polymerization temperatures, e.g., 50–100° C. Useful initiators thus include peroxide-type initiators, such as benzoyl peroxide, lauroyl peroxide, acetyl peroxide, caprylyl peroxide, decanoyl peroxide, propionyl peroxide, t-butylperoxypivalate, t-butylperoxyisobutyrate, 2,4-dichlorobenzoyl peroxide, p-chlorobenzoyl peroxide, succinic acid peroxide, isopropyl percarbonate, and the like. Particularly useful are the azo initiators, such as azo-bis-isobutyronitrile.

The amount of free radical initiator used ordinarily varies between about 0.05 and 0.50 percent by weight, based upon the total weight of the polymerization mass. If the amount of free radical initiator is increased, the rate of reaction is increased but the molecular weight (indicated by the intrinsic viscosity) is reduced. For polymers in the lower range of useful divinylbenzene content, it is advantageous, from the standpoint of impact strength, to use less initiator and to allow the chains of pre-polymer to grow to greater length. The use of less initiator also makes the reaction more easily controllable, because the rate of reaction obviously decreases with decreasing initiator content and there is less initiator present when termination of the polymerization is required. The rate of reaction can also be controlled by adding the initiator incrementally as the reaction progresses. The length of the polymer chains can be regulated by the addition of chain transfer agents, such as lauryl mercaptan, t-dodecylmercaptan, n-dodecylmercaptan, and the like, in amounts of about 0.05–0.5 percent by weight of the total polymerization mass.

As the polymerization of the syrup progresses, the intrinsic viscosity, measured in toluene at 30° C., increases at first gradually and then abruptly. The abrupt change in intrinsic viscosity, which occurs at a viscosity of about 0.4–0.6 dl./g., depending upon the divinylbenzene content of the system, is indicative of the formation of the latent gel structure. In the preparation of the pre-polymer, polymerization is allowed to continue beyond this point, that is, to above about 0.65 dl./g. At an intrinsic viscosity of about 0.65 dl./g., the pre-polymer is capable of orienting pearl pigment and is generally useful in applications requiring an impregnation step. As the polymerization progresses further, the mass reaches the point of incipient visible gel formation. Pre-polymerization must be terminated at this point and any visible gel formed in the reaction mixture can be eliminated by increasing the speed of agitation. Rapid agitation causes disentanglement of polymer chains and results in the elimination of visible gel from the system.

Polymerization is terminated by cooling with water, using either internal cooling coils or a jacketed kettle. If a very rapid cooling is desired, special low temperature coolants can, of course, be used.

The pre-polymer syrup thus made can, if desired, be stabilized by a polymerization inhibitor, such as hydroquinone or p-t-butylcatechol. The syrup has an intrinsic viscosity ranging between about 0.65 and 1.5 dl./g. and a syrup viscosity between about 100 and 12,000 cps.

For those applications in which superior physical properties are required, the amount of divinylbenzene present in the ultimate copolymer must be increased over the amount contained in the pre-polymer syrup. A polymer having a spaced distribution of divinylbenzene is made by adding to the syrup, either before, during, or after cooling, an additional amount of divinylbenzene to bring the total weight of divinylbenzene from 4–12 percent by weight. Additional free radical initiator should be added at this point to assist in the completion of the polymerization. The preferred initiator and the amount added depends upon the conditions of cure. The amount of added initiator generally ranges between about 0.1 and 0.5 percent by weight, based upon the total weight of the polymerization mass.

In the preparation of clear cast sheets or reinforced plastics, the curing is generally carried out at a temperature between about 60 and 150° C., using pressures varying from the pressure of simple contact up to about 500 lbs./sq. in. In preparing the lustrous sheets for use in button blank manufacture, curing is done at a lower temperature to avoid the adverse effect of excessive heat on the pearl pigment. Suitable curing temperatures for button blank sheets range between about 60 and 90° C., and curing generally is accomplished in a period of from 2–5 hours.

The button blank sheets are prepared by adding to the pre-polymer syrup additional divinylbenzene to provide a total divinylbenzene content of 4–12 percent by weight, additional free radical initiator to promote curing, and from 0.25–2 percent by weight pearl pigment. The pearl pigment can be natural pearlescence, obtained from fish scales, or any of the available types of synthetic pearlescence, preferably basic lead carbonate. Synthetic pearlescence is commercially available in the form of 11–60 percent dispersions in an organic solvent. Orientation of the pearl pigment is accomplished by any of the recognized methods in the art for causing the pigment to move within a viscous syrup, conveniently by subjecting the mold to movement, vibration, or reciprocating motion, as described in U.S. Pat. 2,971,223 by Louis Grunin et al. It is also possible to orient the crystals by centrifugal casting, as shown by Gerson in U.S. Pat. 2,856,635, or electrical excitation, as described in Hunsdiecker patent, U.S. 3,073,732. The polymeric mass is then cured as described hereabove, resulting in a cast sheet of excellent pearly luster.

Our invention is further illustrated by the following examples.

Example I

To a stainless steel, full jacketed kettle, 24 in. in diameter and 26 in. deep with an open top and equipped with a large and small agitator, there was charged 243 lbs. styrene monomer. The styrene was heated to a temperature of 81° C. and, with stirring using the small agitator, 114 g. (0.1 percent by weight, based on the weight of charge) of azo-bis-isobutyronitrile was added thereto. At a rate of 75 ml. per minute, 8 lbs. 2 oz. of commercial (57 percent) divinylbenzene (corresponding to about 1.7 percent divinylbenzene, based on the weight of charge) was added to the stirred reaction mixture. The temperature reached 88–93° C. and was maintained at this level. After about 56–60 minutes, the mass became stringy and viscous. The small agitator was turned off and the larger agitator was set at low speed. The agitation was sufficient to disentagle the visible gel and the mass once more became clear and smooth. The average polymerization rate was 26.2 percent per hour. At the completion of the reaction, 18 lbs. 4 oz. of commercial divinylbenzene (corresponding to about 4 percent divinylbenzene, based on the weight of the charge) was added and the mix was cooled to room temperature. The syrup containing the additional divinylbenzene was stabilized with 0.005 percent t-butylcatechol. The syrup had an intrinsic viscosity of 1.17 dl./g. measured in toluene at 30° C., a syrup viscosity (Brookfield) of 760 cps. (spindle LV-3 at 60 r.p.m.), and contained 21.4 percent by weight copolymer in admixture with unreacted monomer. A portion of the syrup was used to make clear castings by adding 0.3 percent by weight lauroyl peroxide and curing at 71° C. for four hours. To another portion of the syrup there was added 1.3 percent by weight of a 35 percent by weight dispersion of basic lead carbonate synthetic pearlescence. After adding 0.3 percent by weight lauroyl peroxide, the syrup containing the pearl pigment was placed in a vibrating mold and cured for four hours at 71° C. There was thus obtained a uniform lustrous sheet suitable for fabrication of button blanks.

The impact strength of the clear and pearled cast sheets was evaluated using a modification of the standard Gardner Impact Strength Test. In the modification a lighter weight (45 g.) was used in order to permit measurements to be made in smaller units than one in.-lb. The $F_{50}$ values thus obtained were corrected for the change in falling weight. The clear casting had an impact strength of 1.84 in.-lbs. and the pearl casting one of 0.93 in.-lb. An impact strength of 1.84 in.-lbs. corresponds to the maximum reported by Boundy and Boyer for styrene-divinylbenzene copolymers The clear casting was evaluated for solvent resistance by subjecting a weighed sample to Soxhlet extraction with toluene for 56 hours. The contents of the receiver were evaporated to constant weight. The toluene extractables of cast sheets amounted to about 2.3 percent, showing excellent solvent resistance.

The clear and pearled sheets were heated in an oven at 150° C. for about six minutes and cut hot into button blanks. The blanks were evaluated for resistance to hot iron abrasion and detergents.

The hot iron test was made by placing six buttons on a cloth-wrapped board face up and placing a small hotplate (weight about three lbs.) upside down so that the hotplate surface made direct contact with the face of the buttons. The buttons were thus subjected to a temperature of 550° F. for periods of one to three minutes. Both the clear and the pearled button blanks showed excellent resistance after a one minute exposure and good resistance after three minutes exposure.

The detergent test was made for 16 and 24 hour periods by placing the buttons in a jar containing 0.5 percent by weight Oxydol detergent solution in tap water and placing the jar in an oven maintained at 93° C. After 16 hours of exposure, both the clear and pearled samples underwent some degradation, but were still within the range of acceptability. The pearled sheet showed no additional degradation after 24 hours, but the clear casting degraded to a measurable extent. Polyester button blanks degrade measurably after three hours when subjected to this test.

Example II

The procedure of Example I was substantially repeated with the exception that the amount of divinylbenzene added after the preparation of the syrup was varied. In one run 4.65 lbs. of commercial divinylbenzene (2.3 percent by weight of the charge) was added after completion of the syrup preparation, and in the second run 11.65 lbs. of additional divinyl-benzene (5.7 percent by weight of the charge) was added. The first syrup (containing less added divinylbenzene) contained 18.5 percent copolymer and had an intrinsic viscosity of approximately 1.1 dl./g. The second syrup contained 14.8 percent copolymer and had an intrinsic viscosity of 1.14 dl./g.

Clear and pearled castings were made from the two syrups as described in Example I. The impact strength of the clear castings from the first syrup were 1.36 in.-lbs. and the toluene extractables were 1.9 percent. Castings from the second syrup had impact strengths of 1.52 (clear) and 0.83 (pearled) in.-lbs. The toluene extractables were 1.5 percent by weight. The clear and pearled castings from both syrups showed good resistance to hot iron abrasion. The detergent resistance of clear castings made from the first syrup was poor, but the detergent resistance of clear castings made from the second syrup was excellent. The results indicate that a better quality product, particularly from the standpoint of detergent resistance, can be made by introducing more divinylbenzene into the system after the preparation of the pre-polymer.

Example III

A series of experiments were made in laboratory equipment by charging 365.3 g. of styrene to a one-quart friction top reactor equipped with an air stirrer. The air stirrer speed was adjusted to 750–800 r.p.m. to simulate plant conditions. The reactor was surrounded by a water bath which was brought to the desired temperature. A series of runs were made at 90° C. using varying amounts of azo-bis-isobutyronitrile initiator. A 10.4 g. quantity of commercial (57.6 percent) divinylbenzene (1.5 percent divinylbenzene, based on the charge) was charged at a linear rate throughout the entire polymerization period. Samples were withdrawn at intervals to provide information on conversion and molecular weight (intrinsic viscosity). When the reaction mass reached the desired viscosity, cooling water was turned on and the remainder of the divinylbenzene (24.3 g. of commercial materials, 3.5 percent by weight of the charge) was added at once. A final sample was taken for conversion and molecular weight after the bath had been cooled below 40° C. The syrups thus prepared were stabilized for further use by adding a small amount of p-t-butylcatechol. The results for runs made at concentrations of 0.1, 0.2, and 0.3 percent by weight of total charge of azo-bis-isobutyronitrile are shown below in Table I. The polymerization rates were 24, 37, and 45 percent per hour, respectively.

TABLE I

| Time of sampling, min. | Conversions at initiator concentrations, percent | | | $[\eta]$ at initiator concentrations, dl./g.[1] | | |
|---|---|---|---|---|---|---|
| | 0.1 | 0.2 | 0.3 | 0.1 | 0.2 | 0.3 |
| 15 | 10.0 | 14.4 | 18.2 | 0.30 | 0.24 | 0.19 |
| 30 | 15.9 | 23.2 | 29.3 | 0.36 | 0.27 | 0.24 |
| 45 | 19.9 | 28.9 | 35.9 | 0.42 | 0.34 | 0.25 |
| Final Syrup | 23.6 | 30.9 | 37.2 | 0.86 | 0.71 | 0.66 |

[1] Measured in toluene at 30° C.

Example IV

The procedure of Example III was substantially repeated using 0.2 percent by weight of total charge of azo-bis-isobutyronitrile. All of the divinylbenzene used in making the syrup (1.5 percent by weight of charge) was added at the start of the run. The final syrup contained 22.4 percent by weight polymer and had an intrinsic viscosity of 1.06 dl./g.

Example V

The procedure of Example III was substantially repeated using 0.2 percent by weight azo-bis-isobutyronitrile. A special divinylbenzene (90 percent by weight divinylbenzene) was substituted for the commercial divinylbenzene of Example III. The final syrup contained 32.5 percent by weight polymer and had an intrinsic viscosity of 0.77 dl./g.

Example VI

The procedure of Example III was substantially repeated using a temperature of 75° C. and benzoyl peroxide and lauroyl peroxide as initiators in place of azo-bis-isobutyronitrile. The amounts of the peroxides used correspond to 0.2 percent by weight azo-bis-isobutyronitrile on a molar basis. The polymerization rates were 5 and 8 percent per hour, respectively. The results are shown in Table II.

TABLE II

| Sample time taken, min. | Conversion, percent | $[\eta]$[1], dl./g. |
|---|---|---|
| Benzoyl peroxide, 0.294%[2]: | | |
| 60 | 3.9 | 0.40 |
| 120 | 9.1 | 0.48 |
| 180 | 14.0 | 0.47 |
| 210 | 16.2 | 0.51 |
| 222 | 17.0 | 0.52 |
| 232 | 17.6 | 0.53 |
| 255 | 18.9 | 0.58 |
| Final syrup | 22.3 | 0.93 |
| Lauroyl peroxide, 0.492%[2]: | | |
| 30 | 3.7 | 0.38 |
| 45 | 6.1 | 0.37 |
| 60 | 8.3 | 0.39 |
| 75 | 10.4 | 0.41 |
| 90 | 12.3 | 0.46 |
| 101 | 13.6 | 9.49 |
| Final syrup | 16.0 | 0.66 |

[1] All samples contained gel; measured in toluene at 30° C.
[2] Equivalent to 0.2% by weight azo-bis-isobutyronitrile on a molar basis.

The results show that using the peroxide initiators at 75° C., the desired intrinsic viscosity can be reached.

Example VII

The procedure of Example III was substantially repeated using 0.1 percent azo-bis-isobutyronitrile as the initiator. Two runs were made; one using 0.1 percent by weight t-dodecylmercaptan and the other using 0.1 percent by weight n-dodecylmercaptan as chain transfer agents. The chain transfer agents were added to the styrene at the beginning of the syrup preparation. The initial and final amounts of divinylbenzene were the same as those used in Example III. The syrup made with t-dodecylmercaptan contained 20.2 percent polymer and had an intrinsic viscosity of 1.13 dl./g. That made with n-dodecylmercaptan contained 17 percent polymer and had an intrinsic viscosity of 1.26 dl./g.

Clear and pearled castings were made from both syrups as described in Example I. The impact strengths were 1.62 and 1.70 in.-lbs. (clear sheet) and 1.47 and 1.38 in.-lbs. (pearled), respectively. The pearled sheet showed a definite improvement in impact strength when compared to those of Examples I and II All sheets had an excellent rating when subjected to the hot iron test, and the detergent resistance of clear sheets made from both syrups was dramatically improved. The detergent resistance of the pearled sheets was acceptable in both cases.

Example VIII

A 360 g. quantity of styrene and 40 g. of commercial (57 percent) divinylbenzene (5.7 percent divinylbenzene, based on the charge) were mixed together with 0.3 percent lauroyl peroxide and cast into a sheet by heating at 71° C. for four hours. The impact strength of the sheet was 1.19 in.-lbs. and the toluene extractables were about four percent. The results show that a cast sheet made from an identical polymer composition, but without the syruping step of the invention, is inferior in impact strength to clear castings made according to the method of the invention. Furthermore, the simple mixture of monomers is incapable of orienting pearl and is unsuited for numerous other applications for which the novel stable syrup of the invention can be used.

Example IX

The procedure of Example III was repeated using 0.15 percent by weight azo-bis-isobutyronitrile as the initiator. The amount of divinylbenzene added to the syrup was increased to 17.35 g. (2.5 percent based on the charge) and the amount of additional divinylbenzene added after the formation of the syrup was reduced to 17.35 g. (2.5 percent based on the charge). In a second experiment, 17.35 g. of divinylbenzene (2.5 percent) was added initially and 34.7 g. (5 percent) was added after the formation of the syrup. Polymerization proceeded at a rate of 35.5 percent per hour. The first syrup contained 22.3 percent polymer and had an intrinsic viscosity of 0.99 dl./g. The second syrup had a polymer content of 21 percent and an intrinsic viscosity of 0.77 dl./g. Clear sheets cast from the first syrup had an impact strength of 2.49 in.-lbs. Pearled sheet made from the second syrup had an outstanding impact strength of 2.10 in-lbs. Toluene extractables from clear sheets were approximately 2–3 percent.

Example X

The procedure of Example III was repeated with the exception that the ratio of initial divinylbenzene (added to the syrup) to final divinylbenzene was changed to correspond to approximately 1:9 commercial divinylbenzene (0.5:4.5 percent based on the charge). A 0.2 percent quantity of azo-bis-isobutyrontrile was used as the initiator in the syruping step. The resulting syrup contained 44.3 percent polymer and had an intrinsic viscosity of 0.65 dl./g. Clear castings made from the syrup had an impact strength of only 0.54 in.-lb. and the toluene extractables were in excess of 18 percent. The results show that if insufficient divinylbenzene is present in the syruping step, the outstanding impact strength and solvent resistance of polymers made according to the method of the invention cannot be obtained.

Example XI

A 360 g. quantity of styrene was polymerized with 0.09 percent by weight benzoyl peroxide at 78° C. for six hours. The resulting syrup had a polymer content of 22.2 percent and a Brookfield viscosity of 700 cps. A 40 g. quantity of divinylbenzene (5.7 percent of the charge) was added. The final polymer content, after the addition of the divinylbenzene, was 20 percent and the intrinsic viscosity was 0.93 dl./g. The syrup thus prepared was capable of orienting pearl in clear and cast sheets made therefrom as described in Example I. The impact strength of the clear sheet was 0.94 in.-lbs., and the toluene extractables were about 20 percent, indicating complete lack of solvent resistance.

Example XII

Syrup was made as described in Example IV from a mixture of monomers corresponding to 90 percent by weight styrene and 10 percent by weight commercial divinylbenzene. In one run no additional divinylbenzene was added, and in a second run an additional 5 percent by weight commercial divinylbenzene was added to the syrup upon cooling. The preparations were run at 80° C. using 0.1 percent azo-bis-isobutyronitrile as the initiator. The syrups thus prepared had an intrinsic viscosity in excess of 1.75 and a polymer content of about 6 percent. Castings made from both syrups cracked in the mold, presumably due to high internal strains.

We claim:
1. Method of making a styrene-divinylbenzene copolymer containing up to 12 percent by weight divinylbenzene comprising:
 (a) polymerizing styrene and from 1–3.5 percent by weight, based on the total weight of monomer, of divinylbenzene by heating a stirred mixture of styrene and divinylbenzene to a temperature of 50 to 100° C. in the presence of sufficient free radical initiator to provide a polymerization rate of 20 to 60 percent per hour;
 (b) continuing the polymerization under agitation for a period of time until the intrinsic viscosity of the mixture is at least 0.65;
 (c) terminating the polymerization before gelation occurs to provide a pre-polymer syrup, characterized by a latent gel structure, of copolymer in admixture with unreacted monomer;
 (d) adding additional divinylbenzene to bring the total weight of divinylbenzene to 4 to 12 percent by weight;
 (e) adding 0.25–2 percent by weight pearl pigment;
 (f) subjecting the pearl pigment particles in the pre-polymer syrup to movement to effect systematic orientation of said particles; and
 (g) continuing the polymerization at a temperature of 60 to 90° C. in the presence of additional free radical initiator until polymerization is complete.

2. Method according to claim 1 wherein the free radical initiator used to provide the pre-polymer syrup is azo-bis-isobutyronitrile and the added free radical initiator is lauroyl peroxide.

References Cited

UNITED STATES PATENTS 2,539,377    1/1951    Staudinger et al. _____ 260—886

MORRIS LIEBMAN, Primary Examiner

J. H. DERRINGTON, Assistant Examiner